United States Patent
Lee

(10) Patent No.: US 8,933,795 B2
(45) Date of Patent: Jan. 13, 2015

(54) VIDEO DISPLAY APPARATUS AND METHOD

(75) Inventor: Hansung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1062 days.

(21) Appl. No.: 12/972,149

(22) Filed: Dec. 17, 2010

(65) Prior Publication Data

US 2011/0267184 A1 Nov. 3, 2011

(30) Foreign Application Priority Data

Apr. 30, 2010 (KR) .......................... 10-2010-0041080

(51) Int. Cl.
| | | |
|---|---|---|
| B60Q 1/00 | (2006.01) | |
| H04N 7/18 | (2006.01) | |
| B60Q 9/00 | (2006.01) | |
| B62D 15/02 | (2006.01) | |
| G08G 1/16 | (2006.01) | |

(52) U.S. Cl.
CPC .............. *B60Q 9/008* (2013.01); *B62D 15/029* (2013.01); *G08G 1/16* (2013.01)
USPC .......................................... 340/435; 348/148

(58) Field of Classification Search
CPC .......................... H04N 19/00169; G06F 3/041
USPC .................. 348/148, 118, 128, 436; 340/435, 340/932.2, 425.5, 436; 701/301, 207
See application file for complete search history.

(56) References Cited

U.S. PATENT DOCUMENTS

| | | | | |
|---|---|---|---|---|
| 5,983,161 | A * | 11/1999 | Lemelson et al. | 701/301 |
| 7,509,217 | B2 * | 3/2009 | Endoh | 701/300 |
| 7,760,113 | B2 * | 7/2010 | Uhler | 340/932.2 |
| 8,310,353 | B2 * | 11/2012 | Hinninger et al. | 340/435 |
| 8,421,863 | B2 * | 4/2013 | Yumiba et al. | 348/148 |
| 8,543,330 | B2 * | 9/2013 | Taylor et al. | 701/408 |
| 8,723,948 | B2 * | 5/2014 | Gotz et al. | 348/135 |
| 2004/0016870 | A1 * | 1/2004 | Pawlicki et al. | 250/208.1 |
| 2006/0206243 | A1 * | 9/2006 | Pawlicki et al. | 701/1 |

FOREIGN PATENT DOCUMENTS

| | | |
|---|---|---|
| JP | 2005-199892 A | 7/2005 |
| JP | 2008-49959 A | 3/2008 |
| JP | 2009-143410 A | 7/2009 |

* cited by examiner

*Primary Examiner* — Benjamin C Lee
*Assistant Examiner* — Sigmund Tang
(74) *Attorney, Agent, or Firm* — Birch, Stewart, Kolasch & Birch, LLP

(57) ABSTRACT

A apparatus and method for preventing a crash between a vehicle and an obstacle are discussed. A video display apparatus includes a capturing unit configured to capture an image of a vehicle and surroundings of the vehicle. A controller is configured to detect an outline of the vehicle and a boundary line of an obstacle from the image captured by the capturing unit, calculate the distance between the outline of the vehicle and the boundary line of the obstacle and generate an alert image when the distance between the vehicle outline and the boundary line is less than a preset distance value. A display unit is configured to display the alert image.

19 Claims, 10 Drawing Sheets

VIDEO DISPLAY APPARATUS AND METHOD

CROSS-REFERENCE TO RELATED APPLICATION

Pursuant to 35 U.S.C. §119(a), this application claims the benefit of earlier filing date and right of priority to Korean Application No. 10-2010-0041080, filed on Apr. 30, 2010, the contents of which is incorporated by reference herein in its entirety.

BACKGROUND OF THE INVENTION

1. Field of the Invention

The present invention relates to a video display apparatus and method.

2. Background of the Invention

In general, a video display apparatus captures (photographs, shoots) an object to be captured in response to a user's request, and outputs the captured object on a display unit.

SUMMARY OF THE INVENTION

Therefore, an object of the present invention is to provide a video display apparatus and method to alert a driver to a possible crash.

It is another object of the invention to provide an apparatus and method to provide a video display on each side of a vehicle.

It is still another object of the invention to provide an apparatus an method providing an image and text displaying an area of a possible crash.

To achieve these and other advantages and in accordance with the purpose of the present invention, as embodied and broadly described herein, there is provided a video display apparatus a capturing unit configured to capture a vehicle and surroundings of the vehicle, a controller configured to detect an outline of the vehicle and a boundary line of an obstacle from the captured images, and generate an alert image when a distance between the vehicle outline and the boundary line is less than a preset distance value, and a display unit configured to display the alert image.

In one aspect of the present invention, the alert image may be an image corresponding to an area in which the distance between the vehicle outline and the boundary line is less than the preset distance value.

In another aspect of the present invention, the controller may detect an image corresponding to an area in which the distance between the vehicle outline and the boundary line is less than the preset distance value, and display the detected image on the display unit.

In yet another aspect of the present invention, the alert image may include an alert message.

In still another aspect of the present invention, the controller may output an alert sound when the distance between the vehicle outline and the boundary line is less than the preset distance value.

In another aspect of the present invention, the capturing unit may include a first camera configured to capture a front side of the vehicle and surroundings of the front side, a second camera configured to capture a rear side of the vehicle and surroundings of the rear side, a third camera configured to capture a right side of the vehicle and surroundings of the right side, and a fourth camera configured to capture a left side of the vehicle and surroundings of the left side.

In another aspect of the present invention, the controller may detect edge points of the obstacle, select the closest edge point to the vehicle outline from the edge points, and decide a straight line perpendicularly drawn from the selected edge point as the boundary line.

In another aspect of the present invention, the controller displays a distance value between the vehicle outline and the boundary line on the display unit when the distance value between the vehicle outline and the boundary line is less than the preset distance value.

In another aspect of the present invention, the controller may display a crash-estimated location on the display unit based upon an image corresponding to an area in which the distance between the vehicle outline and the boundary line is less than the preset distance value.

In another aspect of the present invention, the controller may enlarge an image corresponding to an area in which the distance between the vehicle outline and the boundary line is less than the preset distance value, and display the enlarged image on the display unit.

In accordance with one embodiment of the present invention, there is provided a video display method including capturing a vehicle and surroundings of the vehicle by a capturing unit, detecting an outline of the vehicle and a boundary line of an obstacle from the images captured by the capturing unit, generating an alert image when a distance between the vehicle outline and the boundary line is less than a preset distance value, and displaying the alert image on a display unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Description will now be given in detail of a video display apparatus and method, which is capable of preventing beforehand damages on a vehicle due to a crash with an obstacle by monitoring a distance between a vehicle outline and the obstacle around the vehicle in real time, in accordance with the exemplary embodiments according to the present disclosure, with reference to FIGS. 1 to 13.

Figure 1:
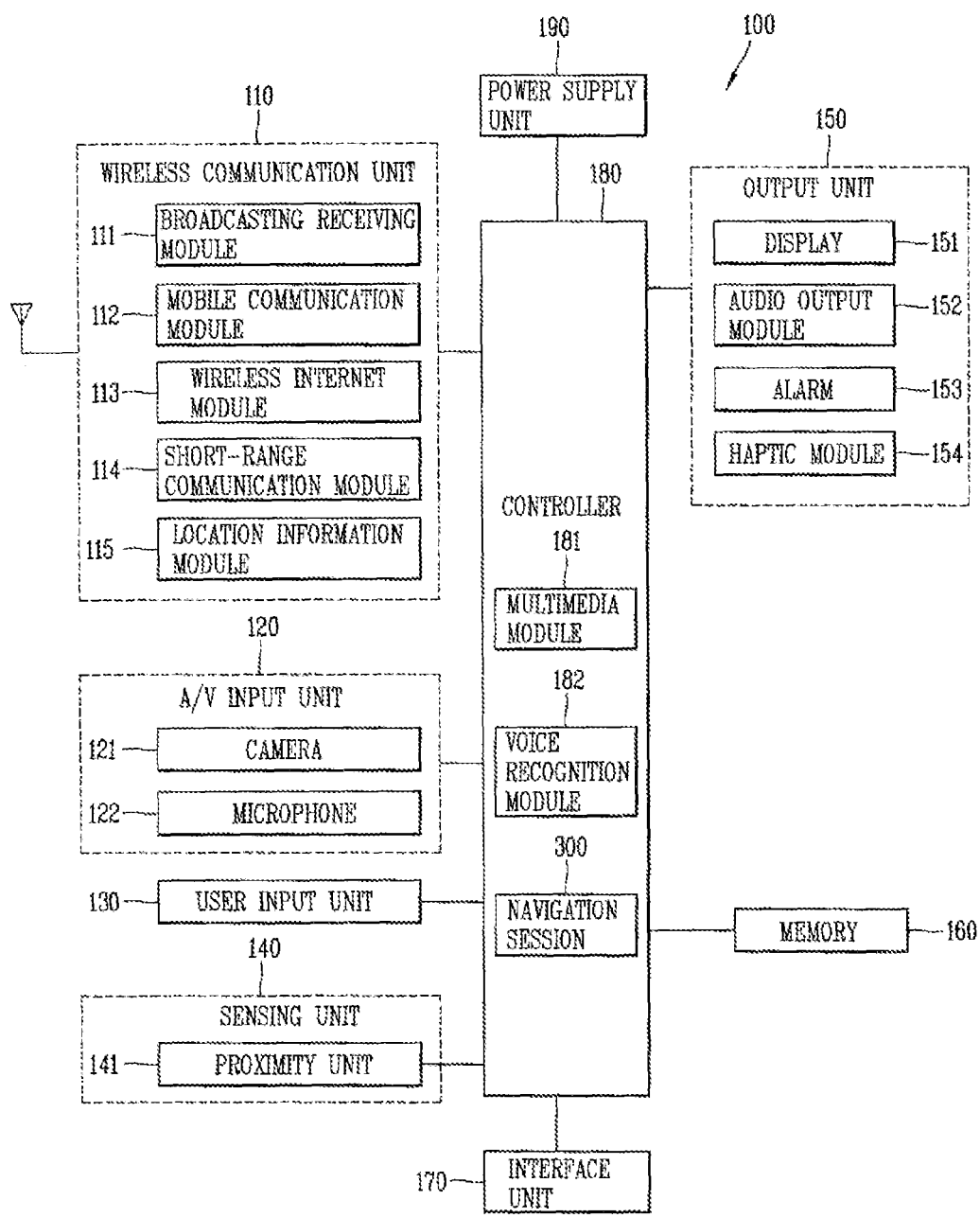
FIG. 1 is a block diagram illustrating a configuration of a mobile communication terminal to which a video display apparatus in accordance with exemplary embodiments of the present disclosure is applied.

FIG. 1 is a block diagram illustrating a configuration of a mobile communication terminal 100 to which a video display apparatus according to exemplary embodiments of the present invention is applied. The mobile communication terminal 100 may be implemented in various forms. For example, mobile communication terminals 100 can be portable phone, smart phone, notebook computer, digital broadcast receiver, personal digital assistant (PDA), portable multimedia player (PMP), and the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. FIG. 1 illustrates the mobile communication terminal 100 having various components, but it is understood that implementing all of the illustrated components is not a requirement. More or less components may alternatively be implemented.

The wireless communication unit 110 typically includes one or more elements allowing radio communication between the mobile communication terminal 100 and a wireless communication system, or between the mobile communication terminal 100 and a network, in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may generate and transmit a broadcast signal and/or broadcast associated information or receive a previously generated broadcast signal and/or broadcast associated information and then transmit the same to the mobile communication terminal 100. Here, the broadcast associated information may include information regarding a broadcast channel, a broadcast program, a broadcast service provider, and the like. Further, the broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network. In this case, the broadcast associated information may be received by the mobile communication module 112. The broadcast signal may exist in various forms. For example, the broadcast signal may be an electronic program guide (EPG) of digital multimedia broadcasting (DMB), electronic service guide (ESG) of digital video broadcast-handheld (DVB-H), and the like.

Further, the broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal, and a server over a mobile communication network. Here, the radio signal may include a voice call signal, a video call signal and/or various types of data according to text and/or multimedia message transmission and/or reception.

The wireless Internet module 113 may support wireless Internet access and may be built-in or externally installed to the mobile communication terminal 100. Here, the wireless Internet module 113 may use wireless Internet access technique including a WLAN (Wireless LAN), Wi-Fi, WiBro (Wireless Broadband), WiMax (World Interoperability for Microwave Access), HSDPA (High Speed Downlink Packet Access), and the like.

The short-range communication module 114 may support a short-range communication and may use a short-range communication technology including Bluetooth, Radio Frequency Identification (RFID), Infrared Data Association (IrDA), Ultra Wideband (UWB), ZigBee, Wireless LAN (Bluetooth, protocols such as 802.11n, etc.) and the like.

The location information module 115 may check or acquire a location of the mobile communication terminal 100. A GPS module may be used as the location information module 114. For example, the GPS module may receive location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system also may be applicable thereto.

Referring to FIG. 1, the A/V (audio/video) input unit 120 may receive an audio or video signal. For example, the A/V (audio/video) input unit 120 includes a camera 121 and a microphone 122. The camera 121 may process an image frame, still picture or video, obtained by an image sensor in a video phone call or an image capturing mode. Further, the processed image frame by the camera 121 may be displayed on a display unit 151, stored in the memory 160 or other storage medium, or transmitted through the wireless communication unit 110. Here, two or more cameras 121 may be provided according to the configuration type and/or use environment of the mobile communication terminal 100.

The microphone 122 included in the A/V input unit 120 may receive an external audio signal through a microphone in a phone call mode, a recording mode, a voice recognition mode, and the like, and process the audio signal into electrical voice data. The processed voice data may be converted and outputted into a format to be transmitted to a mobile communication base station through the mobile communication module 112 in the phone call mode. The microphone 122 may implement various types of noise canceling algorithms to cancel noise generated in a procedure of receiving the external audio signal.

In addition, the user input unit 130 may generate input data to control an operation of the mobile communication terminal 100. The user input unit 130 may include a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 may determine a current status of the mobile communication terminal 100. For example, the sensing unit 140 may determine whether the mobile communication terminal 100 is in an opened or closed state, a location of the mobile communication terminal 100, the presence or absence of user contact, an orientation of the mobile communication terminal 100, an acceleration or deceleration movement of the mobile communication terminal 100, and the like. Further, the sensing unit 140 may generate a sensing signal for controlling the operation of the mobile communication terminal 100. For example, when the mobile communication terminal 100 is a slide phone type, the sensing unit 130 may determine whether the slide phone type mobile communication terminal 100 is in an opened or closed state. Furthermore, the sensing unit 140 may control a sensing function, for example, associated with whether or not power is supplied from the power supply unit 190 and whether or not an external device is coupled with the interface unit 170.

The interface unit 170 interfaces the mobile terminal 100 with all external devices connected to the mobile terminal 100. The interface 170 may include a wire/wireless headset port, an external charger port, a wire/wireless data port, a memory card port, a port to connect a device having an identification module to the mobile terminal 100, an audio Input/Output (I/O) port, a video Input/Output (I/O) port, an earphone port, and so on. Here, the recognition module is implemented as a chip to store each kind of information to identify an authorization right for the mobile terminal 100, and may include a User Identity Module (UIM), a Subscriber Identity Module (SIM), a Universal Subscriber Identity Module (USIM), and so on. A device having the identification module (hereinafter, will be referred to as 'identification device') may be implemented as a smart card type. Accordingly, the recognition module may be connected to the mobile terminal 100 through a port. The interface unit 170 may be configured to receive data or power from an external device to transmit it to each component inside the mobile terminal 100, or may be configured to transmit data inside the mobile terminal 100 to an external device.

As shown in FIG. 1, the output unit 150 is configured to provide an output for audio signal, video signal, or alarm signal, and the output unit 150 may include the display unit 151, an audio output module 152, an alarm unit 153, and the like.

The display unit 151 may display or output information processed in the mobile communication terminal 100. For example, when the mobile communication terminal 100 is in the phone call mode, the display unit 151 may display a User Interface (UI) or a Graphic User Interface (GUI) associated with a call. When the mobile communication terminal 100 is in the video call mode or the image capturing mode, the display unit 151 may display a captured image and/or received image, a UI or GUI.

Further, the display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. Furthermore, two or more display units 151 may be provided according to its embodiment. For example, the mobile communication terminal 100 may include both an external display unit (not shown) and an internal display unit (not shown).

Meanwhile, when the display unit 151 and a sensor for detecting a touch operation (hereinafter, 'touch sensor') are formed with an interlayer structure (hereinafter, 'touch screen'), the display unit 151 may be also used as an input device in addition to an output device. The touch sensor may be configured in a form of, for example, touch film, touch sheet, touch pad, or the like.

Furthermore, the touch sensor may convert a change such as pressure applied to a specific area of the display unit 151 or capacitance generated on a specific area of the display unit 151 into an electrical input signal. The touch sensor may detect a touch input pressure, a touch input position, and a touch input area. For example, when a touch input is made to the touch sensor, a signal (or signals) corresponding to the touch input is sent to a touch controller. Thereafter, the touch controller processes the signal and sends the corresponding data to a controller 180 notifying that a region of the display unit 151 is touched.

Hereinafter, a proximity sensor 141 of a mobile communication terminal 100 will be described with reference to FIG. 2.

Figure 2:
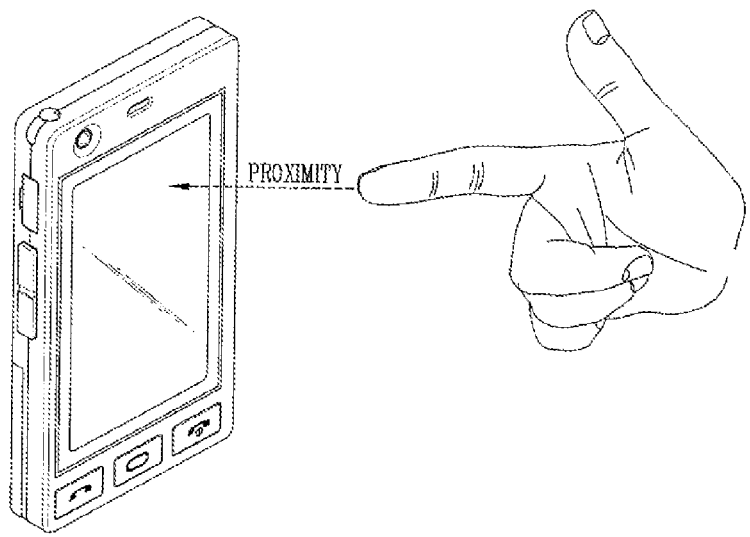
FIG. 2 is a view illustrating a proximity touch process of the mobile communication terminal.

FIG. 2 is a view illustrating a proximity-touch process of a mobile communication terminal 100. Here, the proximity-touch occurs when a pointer approaches to a screen while being at a predetermined distance from the screen without actually touching the screen.

The proximity sensor 141 may be arranged in an inner region of the mobile communication terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span than a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. In particular, when the touch screen is an electrostatic type, the approach of a pointer can be determined based on a change in a field according to the approach of the pointer. In this case, the touch screen (touch sensor) may be classified as a proximity sensor.

Hereinafter, a "proximity touch" may be a state of recognition by the proximity sensor 141 when the pointer is positioned close to the touch screen but not actually brought into contact with the touch screen. On the other hand, a state of recognition of actual contacting of the pointer on the touch screen will be called a "contact touch." The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern, such as a proximity touch distance, a proximity touch direction, a proximity touch speed, a proximity touch time, a proximity touch position, a proximity touch movement state, or the like. Information corresponding to the determined proximity touch operation and the proximity touch pattern can be outputted to the touch screen.

Referring to FIG. 1, the audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal associated with the function performed by the mobile communication terminal 100, such as a call signal reception sound, a message reception sound, etc. The audio output module 152 may include a receiver, a speaker, a buzzer, and the like.

Further, the alarm unit 153 may output a signal to notify the occurrence of an event of the mobile communication terminal 100. Examples of the event occurred in the mobile communication terminal 100 may include call signal reception, message reception, a key signal input, a touch input, and the like. In addition, the alarm unit 153 may output a signal in a different manner, for example, a form of vibration, to notify the occurrence of an event. When a call signal or a message is received, the alarm unit 153 may vibrate the mobile communication terminal 100 through vibration means. When a key signal is inputted, the alarm unit 153 may vibrate the mobile communication terminal 100 through vibration means using a feedback to the key signal input. Here, the user can recognize an occurrence of the through vibration as described above. The signal for notifying an occurrence of the event may be outputted through the display unit 151 or the audio output module 152.

In addition, the haptic module 154 generates various tactile effects, such as vibration, felt by the user. Here, the controller may control the vibration's intensity, pattern, or the like, generated by the haptic module 154. Also, different vibrations may be combined and outputted or sequentially outputted.

The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

Further, the haptic module 154 may be implemented to feel a tactile effect through muscular senses by a finger or arm of the user as well as to transfer a tactile effect through direct contact. There may exist two or more haptic modules 154 according to its configuration. The haptic module 154 may be provided at a place frequently being contacted by the user in a vehicle. For example, it may be provided on a steering wheel, a gearshift lever, a seat, or the like.

Next, the memory 160 may store software programs for processing and controlling the controller 180, or may temporarily store inputted and/or outputted data, such as phonebook, message, still image, video, and the like.

The memory 160 may include at least one type of non-transitory storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile communication terminal 100 may run a web storage that performs the storage function of the memory 160 over the Internet, or operate in association with the web storage.

Further, the interface unit 170 serves as an interface to every external device that may be connected with the mobile communication terminal 100. For example, the interface unit 170 may include a wired or wireless headset port, an external battery charger port, a wired or wireless data port, a memory card port, a ports for connecting a device having an identification module, an audio input/output (I/O) port, a video input/output (I/O) port, an earphone port, and the like. Here, the identification module, as a chip that stores various information for authenticating the authority to use the mobile communication terminal 100, may include a user identity module (UIM), a subscriber identity module (SIM), a universal subscriber identity module (USIM), and the like. In addition, the device having the identification module (hereinafter, 'identifying device') may be a smart card. Accordingly, the identifying device may be connected with the mobile communication terminal 100 through a port. The interface unit 170 may receive data or power from an external device and transfer the received data or power to every element within the mobile communication terminal 100 or may be used to transfer data within the mobile communication terminal 100 to an external device.

When the mobile communication terminal 100 is connected with an external cradle, the interface unit 170 may allow power from the cradle to be supplied to the mobile communication terminal 100 or allow various command signals inputted from the cradle to be transferred to the mobile communication terminal 100. Various command signals or the power inputted from the cradle may operate as a signal for recognizing when the mobile communication terminal is properly mounted on the cradle.

The controller 180 typically controls a general operation of the mobile communication terminal 100. For example, the controller 180 may control a control and processing operation associated with a voice call, a data communication, a video phone call, and the like. In addition, the controller 180 may include a multimedia module 181 for reproducing multimedia content. Here, the multimedia module 181 may be provided within the controller 180 or may be separately provided from the controller 180.

Also, the controller 180 may perform a pattern recognition processing to recognize a handwriting or picture-drawing input performed on the touch screen as a character or image, respectively.

Referring to FIG. 1, the power supply unit 190 receives external or internal power to supply the power required for an operation of each element under a control of the controller 180.

The function of an element applied to the mobile communication terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application written in any suitable programming language. Here, the software codes may be stored in the memory 160 and executed by the controller 180.

Further, the voice recognition module 182 recognizes a voice uttered by a user, and performs a relevant function based on the recognized voice signal.

A navigation session 300 applied to the mobile communication terminal 100 displays a travel path on data map.

In the meantime, a video display apparatus applied to the mobile communication terminal 100 may be connected to a vehicle via a vehicle interface disposed within the vehicle, and be connected to a plurality of cameras mounted to the vehicle via the vehicle interface. Also, the video display apparatus may include a capturing unit configured to capture the vehicle and surroundings of the vehicle and output the captured images, a controller configured to detect an outline of the vehicle and a boundary line of an obstacle from the captured images, detect a distance value between the vehicle outline and the boundary line, and generate and output an alert image when the distance value is less than a preset distance value, and a display unit configured to display the output alert image. When the distance between the vehicle outline and the boundary line is less than the preset distance value, the controller may detect an image corresponding to the area, in which the distance between the vehicle outline and the boundary line is less than the preset distance value, and display the detected image on the display unit.

Hereinafter, description will be made in detail of a video display apparatus and method according to the first and second embodiments.

Figure 3:
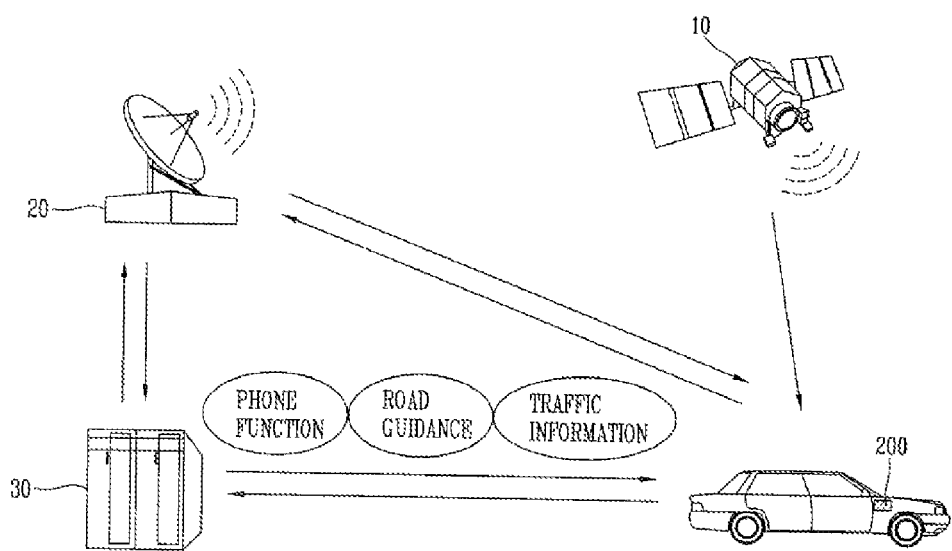
FIG. 3 is a block diagram illustrating a vehicle navigation system to which a video display apparatus according to exemplary embodiments of the present disclosure is applied.

FIG. 3 is a block diagram illustrating a vehicle navigation system to which a video display apparatus according to exemplary embodiments of the present disclosure is applied.

As illustrated in FIG. 3, a vehicle navigation system may include an information providing center 30 for providing traffic information and various data (e.g., programs, executable files, etc.), and a telematics terminal 200 mounted within a vehicle. The telematics terminal 200 is configured to receive traffic information through a long-range wireless communication network 20 and/or a short-range wireless communication network, and to provide a road guide service based on a GPS signal received through a satellite 10 and the traffic information. Here, the communication networks may include wired and wireless communication networks, such as Local Area Network (LAN), Wide Area Network (WAN) and the like. Various traffic information (e.g., road traffic information, interest area information) in addition to traffic light information may be collected via the communication networks, and the collected information may be processed by the information providing center 30 (e.g., a server) according to Transport Protocol Expert Group (TPEG) standard so as to be sent to a broadcasting station. Accordingly, the broadcasting station may insert such traffic information including the traffic light information in a broadcasting signal and send the broadcasting signal to the vehicle 200. Here, the traffic light information may be received from a server (not shown), which is installed in a traffic light, when the vehicle 200 approaches the traffic light.

The server reconstitutes traffic information collected from a variety of sources such as an operator's input, wired and wireless Internet, a digital broadcasting service, such as a Transparent Data Channel (TDC) and a Multimedia Object Transport (MOC), another server or a probe car in a traffic information format such as the format according to the TPEG standard.

The server generates a traffic information format according to the TPEG standard including the traffic light information so as to send to the broadcasting station.

The broadcasting station wirelessly transmits the traffic information including the traffic light information received from the server via the broadcasting signal such that a traffic information reception terminal mounted in the vehicle 200, for example, a navigation apparatus can receive the same. The vehicle information includes the traffic light information. Further, the traffic information may include information about various traffic conditions corresponding to a road, the ocean, and an airline service. For example, the traffic information may include information about an accident, a road status, traffic congestion, road construction, road closure, delay of a public traffic network, delay of an airline service, etc.

The broadcasting station receives the processed traffic information including the traffic light information from the server and transmits the received traffic information to the vehicle 200 through a digital signal according to various digital broadcasting standards. For example, the digital broadcasting standards may include European digital audio broadcasting (DAB) standard based on Yureka-147 [ETSI EN 300 401], a terrestrial or satellite digital multimedia broadcasting (DMB) standard, terrestrial digital video broadcasting (DVB-T) standard, mobile digital video broadcasting-handheld (DVB-H) standard and Media Forward Link Only (MFLO) standard.

Further, the broadcasting station transmits the traffic information including the traffic light information through wired and wireless networks such as the wired and wireless Internet.

The vehicle 200 may be any other type of transportation vehicle, such as a bus, a train, a ship, an airplane, etc., which is constituted using mechanical and electronic devices for the purpose of transportation of people or stuffs.

The vehicle 200 includes a traffic information reception terminal. The traffic information reception terminal receives traffic light information from the broadcasting station, processes the received traffic light information and then outputs the processed traffic light information to a user in graphic, text and/or audio formats.

Hereinafter, the telematics terminal 200 to which the video display apparatus according to the embodiments of the present disclosure will be described with reference to FIG. 4.

Figure 4:
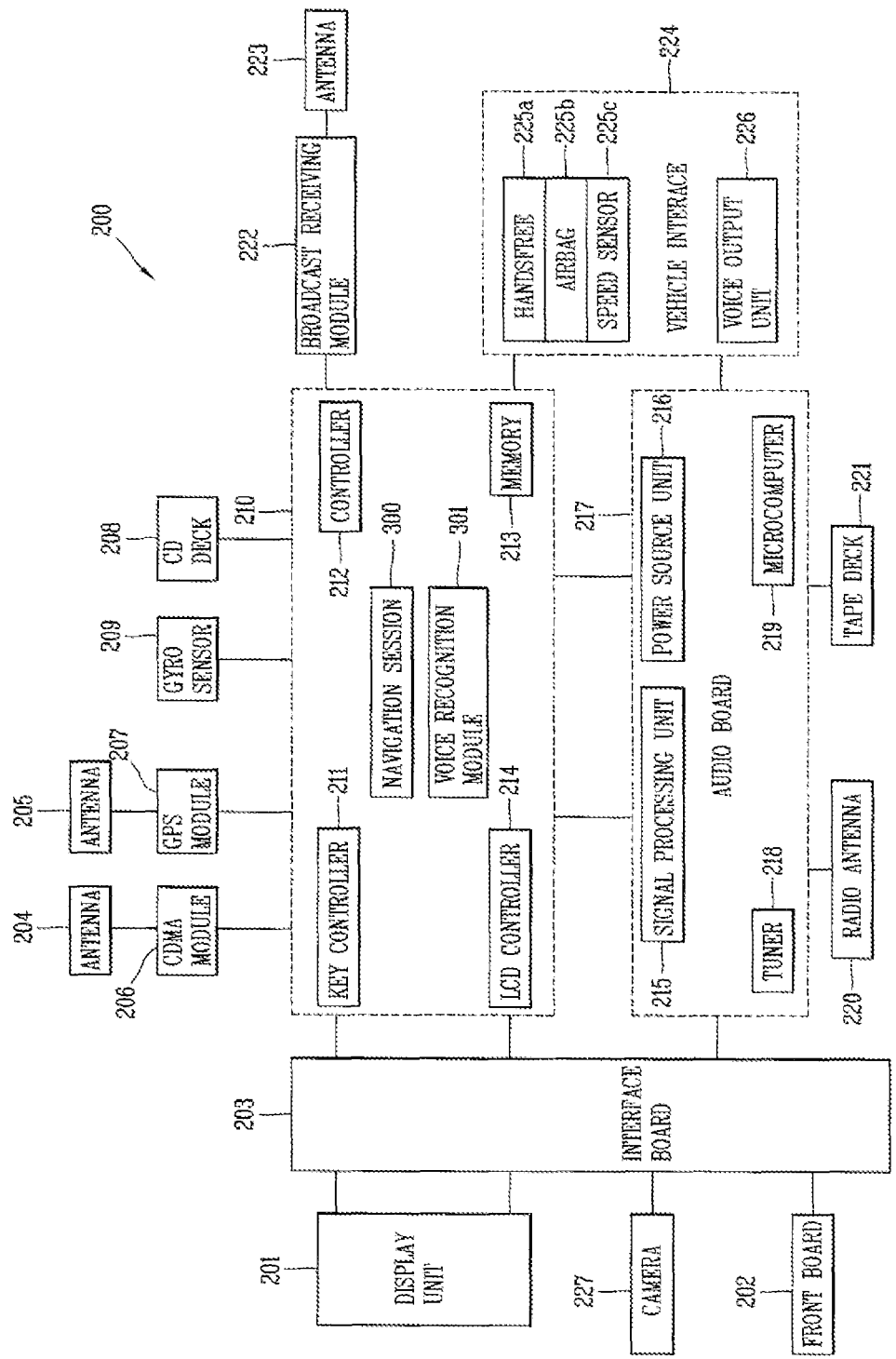
FIG. 4 is a block diagram illustrating a configuration of a telematics terminal to which a video display apparatus according to exemplary embodiments of the present disclosure is applied.

FIG. 4 is a block diagram illustrating a configuration of the telematics terminal 200 to which a video display apparatus according to exemplary embodiments of the present disclosure is applied.

As illustrated in FIG. 4, the telematics terminal 200 may include a controller (e.g., central processing unit (CPU)) 212 for controlling the overall operation of the telematics terminal 200, a memory 213 for storing a variety of information, a key controller 211 for controlling a variety of key signals, and a main board 210 having a liquid crystal display device (LCD) controller 214 for controlling an LCD.

The memory 213 stores map information (map data) for displaying road guide information on a digital map. In addition, the memory 213 stores information for an algorithm of controlling traffic information collection based on an input of traffic information including a road condition in which a vehicle is currently traveling, and information for controlling the algorithm.

The main board 210 may include a code division multiple access (CDMA) module 206 having a unique device number built in a vehicle serving as a mobile communication terminal. The main board 210 may also include a GPS module 207 for receiving a GPS signal to guide a location of a vehicle and to track a traveling path from a departure to a destination, and for transmitting traffic information collected by the user as a global positioning system (GPS) signal. The main board 210 may include a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. Further, the main board 210 is connected via an interface board 203 to a display unit (LCD) 201 controlled by the LCD controller 214, a front board 202 controlled by a key controller 211, and a camera 227 for capturing an inside and/or outside of the vehicle via the interface board 203.

The display unit 201 displays a variety of video signals and text signals, and the front board 202 is provided with buttons for allowing an input of a variety of key signals so as to provide a key signal corresponding to a button selected by the user to the main board 210. In addition, the display unit 201 includes a proximity sensor and a touch sensor (touch screen) of FIG. 2.

The front board 202 is provided with a menu key for allowing a direct input of traffic information, and the menu key may be configured to be controlled by the key controller 211.

The audio board 217 is connected to the main board 210 and processes a variety of audio signals. The audio board 217 may include a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 may include a radio antenna 220 for receiving a radio signal and a tape deck 221 for reproducing an audio tape. The audio board 217 may further include an audio output unit (amplifier) 226 for outputting a voice signal processed by the audio board 217.

The audio output unit (amplifier) 226 is connected to a vehicle interface 224. In other words, the audio board 217 and the main board 210 are connected to the vehicle interface 224. Additionally, a hands-free unit 225a for inputting a voice signal, an airbag 225b for passenger safety, a speed sensor 225c for determining a vehicle speed and the like may be connected to the vehicle interface 224. Here, the speed sensor 225c calculates a vehicle speed, and provides the calculated vehicle speed information to the central processing unit 212.

Here, the display unit 201 may sense a proximity touch within the display window through a proximity sensor. For example, when a pointer, such as a finger or a stylus pen, is proximity-touched, the display unit 201 determines the position of the proximity touch, and outputs position information corresponding to the determined position to the controller 212.

Also, the voice recognition device (or voice recognition module) 301 recognizes a voice uttered by a user, and performs a relevant function based on the recognized voice signal.

Next, the navigation session 300 applied to the telematics terminal 200 may generate road guide information based on map data and current vehicle location information, and notify the generated road guide information to the user. For example, the navigation session 300 displays a travel path on the data map, and automatically forms a wireless network together with a terminal (for example, vehicle navigation apparatus) mounted on a neighboring vehicle and/or a mobile communication terminal carried by a neighboring pedestrian through a wireless communication (for example, short-range wireless communication network) when the location of the mobile communication terminal 100 is within a predetermined distance from a dead zone included in the travel path. Accordingly, the telematics terminal 200 may receive the location information of the neighboring vehicle from the terminal mounted on the neighboring vehicle, and the location information of the neighboring pedestrian from the mobile communication terminal carried by the neighboring pedestrian.

In the meantime, a video display apparatus applied to the telematics terminal 200 may include a capturing unit, such as a camera, configured to capture the vehicle and surroundings of the vehicle and output the captured images, a controller configured to detect an outline of the vehicle and a boundary line of an obstacle from the captured images, detect a distance value between the vehicle outline and the boundary line, and generate and output an alert image when the distance value is less than a preset distance value, and a display unit configured to display the output alert image. When the distance between the vehicle outline and the boundary line is less than the preset distance value, the controller may detect an image corresponding to the area, in which the distance between the vehicle outline and the boundary line is less than the preset distance value, and display the detected image on the display unit.

Hereinafter, description will be made in detail of a video display apparatus and method according to the first and second embodiments.

Figure 5:
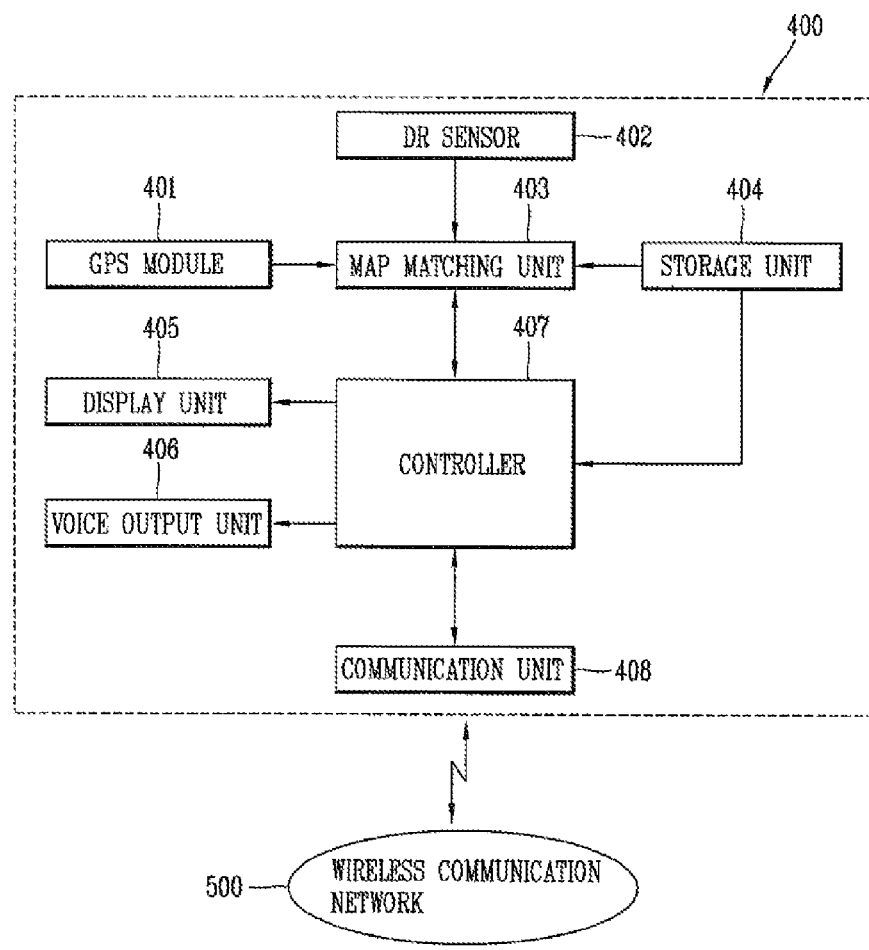
FIG. 5 is a block diagram illustrating a schematic configuration of a navigation (vehicle navigation) apparatus to which a video display apparatus according to exemplary embodiments of the present disclosure is applied.

FIG. 5 is a block diagram illustrating a schematic configuration of a navigation (vehicle navigation) apparatus 400 to which a video display apparatus according to the exemplary embodiments of the present disclosure is applied.

The navigation (vehicle navigation) apparatus 400 may be classified into an in-dash type and an on-dash type according to an installation manner in the vehicle 200. The in-dash type navigation (vehicle navigation) system is inserted into a predetermined space in the dash board of the vehicle 200 and is fixedly mounted. Further, the on-dash type navigation (vehicle navigation) system is provided on the dash board of the vehicle 200 or detachably attached to the dash board using a support member so as to be portable by being separated from the vehicle 200.

The navigation (vehicle navigation) apparatus 400 may include both the in-dash and on-dash type navigation (vehicle navigation) apparatuses. Besides, the navigation apparatus 400 may include any type of information processor, which can receive and/or process traffic information, such as various types of portable terminals, which can perform a navigation function in cooperation with a GPS receiver receiving a navigation message transmitted by the GPS satellite within the vehicle 200.

Referring to FIG. 5, the navigation apparatus 400 may include a GPS module 401 for receiving a GPS signal from the satellite, and generating first vehicle location data of the navigation apparatus (considered as being located at the same position with the telematics terminal 200 or the mobile communication terminal 100) based upon the received GPS signal, a dead-reckoning (DR) sensor 402 for generating second vehicle location data based upon a traveling direction and speed of the vehicle, a storage unit (or memory) 404 for storing map data and various information, a map matching unit 403 for generating an estimated location of the vehicle based upon the first vehicle location data and the second location data, matching the generated vehicle estimated location with a link (map matching link or map matching road) on the map data stored in the storage unit 404, and outputting the matched map information (map matched result), a communication unit 408 for receiving real-time traffic information from an information providing center and/or neighboring vehicles via a wireless communication network 500, receiving traffic light information, and performing a call communication, a controller 407 for generating road guide information based upon the matched map information (map matched result), a display unit 405 for displaying both road guide map (including information on a place (point) of interest) included in the road guide information and the traffic light information, and an audio output unit 406 for outputting road guide audio (voice) information (road guide audio message) included in the road guide information and an audio signal corresponding to the traffic light information.

The communication unit 408 may further include a hands-free having a Bluetooth module, and receive a broadcasting signal including traffic information in the TPEG format from the broadcasting station via an antenna.

The communication unit 408 may further include a hands-free for receiving a call signal and/or a text message received via a base station and having a Bluetooth module, and be configured to receive a broadcasting signal including traffic information in the TPEG format from the broadcasting station via an antenna. The broadcasting signal may include traffic information according to a traffic information (TPEG) service and Binary Format for Scene (BIFS) data service, and additional information, such as a variety of additional data, as well as video and audio data according to various standards, such as terrestrial or satellite DMB, DAB, DVB-T, DVB-H and the like. Also, the communication unit 408 may modulate a signal band providing traffic information and demodulate the modulated signal to output to a TPEG decoder (included in the controller 407).

The TPEG decoder decodes the traffic information in the TPEG format and provides the controller 407 with various information including traffic light information included in the traffic information.

The road guide information may include various information associated with driving a vehicle, such as traffic lane information, driving speed limit information, turn-by-turn information, traffic safety information, traffic guide information, vehicle information, road search information, and the like as well as map data.

The signal received via the GPS module 401 may be configured to provide the location information of a terminal to the navigation apparatus 400 using wireless communication methods, which include the Institute of Electrical and Electronics Engineers (IEEE), such as the IEEE 802.11 Wireless Network Standard for a wireless LAN including wireless LANs, infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

The navigation apparatus 400 may further include an input unit. The input unit may allow a user to select a desired function or input information. Various devices, such as a keypad, a touch screen, a jog shuttle, a microphone and the like may be used as the input unit.

The map matching unit 403 may generate the estimated location of the vehicle based upon the first location data and the second location data, and reads the map data corresponding to a driving path from the storage unit 307.

The map matching unit 403 may also match the estimated location of the vehicle with a link (road) included in the map data, and output the matched map information (map-matched result) to the controller 407. For example, the map matching unit 403 generates an estimated location of the vehicle based on the first and second location data, matches the generated estimated location of the vehicle with links within the map data stored in the storage unit 404 based on the link sequence thereof, and outputs the matched map information (map-matched result) to the controller 407. Further, the map matching unit 403 outputs road attribute information, such as single-level or double-level roads, included in the matched map information (map-matched result) to the controller 407. The function of the map matching unit 403 can also be implemented by the controller 407.

The storage unit 404 may store map data. Here, the stored map data may include geographic coordinates (or latitude/longitude coordinates) representing latitude and longitude with a unit of degree, minute and second (DMS). Here, the stored map data may also use universal transverse Mercator (UTM) coordinates, Universal Polar Stereographic (UPS) coordinates, transverse Mercator (TM) coordinates, and the like, as well as the geographic coordinates.

The storage unit 404 may also store various information such as menu screens, points of interest (hereinafter, "POI"), function characteristic information based on specific locations of the map data, and the like.

The storage unit 404 may also store various user interfaces (UI) and/or graphic user interfaces (GUI), and store data, programs, and the like, which are used for operating the navigation apparatus 400.

The storage unit 404 may store destination information input by a user via the input unit. Here, the destination information may be a target point, or one of departure point and destination point.

The display unit 405 may display image information or road guide map included in the road guide information generated by the controller 407. Also, the display unit 405 may include a touch sensor (touch screen) and a proximity sensor. Furthermore, the road guide information may include various information associated with driving a vehicle, such as traffic lane information, driving speed limit information, turn-by-turn information, traffic safety information, traffic guide information, vehicle information, road search information, and the like as well as map data.

When displaying the image information, the display unit 405 can display various contents such as menu screens, road guide information, and the like, using user interfaces and/or graphic user interfaces included in the storage unit 404. The contents displayed on the display unit 405 may include various text or image data (including map data or various information data), and menu screens including icons, list menus, combo boxes, and the like.

Further, the audio output unit 406 may output voice information or voice messages for road guide information included in the road guide information generated by the controller 407. The audio output unit 406 may be an amplifier or a speaker.

The controller 407 may generate road guide information based on the matched map information, and output the generated road guide information to the display unit 405 and audio output unit 406. Here, the display unit 405 displays the road guide information.

The controller 407 may receive real-time traffic information from the information providing center and/or terminals (vehicle navigation apparatus) mounted in neighboring vehicles so as to generate road guide information.

The controller 407 may be connected to a call center via the communication unit 408 to perform a phone call or transmit or receive information between the navigation system 400 and the call center. Here, the communication unit 408 may further include a hands-free module having a Bluetooth function using a short-range wireless communication method.

In the meantime, the video display apparatus applied to the navigation apparatus 400 may include a capturing unit configured to capture the vehicle and surroundings of the vehicle and output the captured images, a controller configured to detect an outline of the vehicle and a boundary line of an obstacle from the captured images, detect a distance value between the vehicle outline and the boundary line, and generate and output an alert image when the distance value is less than a preset distance value, and a display unit configured to display the output alert image. When the distance between the vehicle outline and the boundary line is less than the preset distance value, the controller may detect an image corresponding to the area, in which the distance between the vehicle outline and the boundary line is less than the preset distance value, and display the detected image on the display unit.

Hereinafter, description will be made in detail of a video display apparatus and method according to the first and second embodiments.

Hereinafter, a video display apparatus according to the embodiments will be described with reference to FIG. 6. The video display apparatus and method according to the embodiments may be applicable to various devices, such as smart phone, desktop computer, notebook computer, digital broadcast receiver, television, personal digital assistant (PDA), portable multimedia player (PMP), and the like, as well as the mobile communication terminal (portable phone) 100, the telematics terminal 200 and the navigation apparatus 400.

Figure 6:
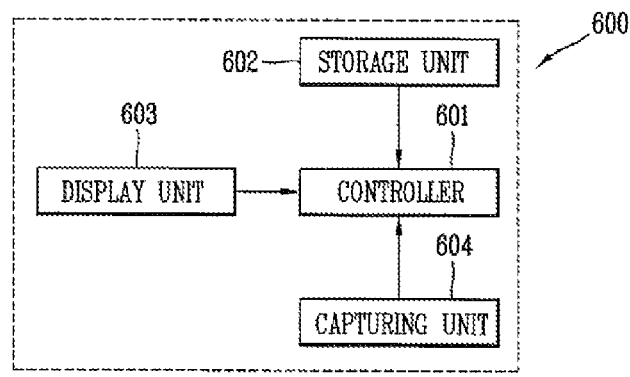
FIG. 6 is a view illustrating a configuration of a video display apparatus in accordance with exemplary embodiments of the present disclosure.

FIG. 6 is a view illustrating a configuration of a video display apparatus in accordance with exemplary embodiments of the present disclosure.

As illustrated in FIG. 6, a video display apparatus 600 according to the embodiments may include a capturing unit 604 configured to capture the vehicle and surroundings of the vehicle and output the captured images, a controller 601 configured to detect an outline of the vehicle and a boundary line of an obstacle from the captured images, detect a distance value between the vehicle outline and the boundary line, and generate and output an alert image when the distance value is less than a preset distance value, and a display unit 603 configured to display the output alert image. When the distance between the vehicle outline and the boundary line is less than the preset distance value, the controller 601 may detect an image corresponding to the area, in which the distance between the vehicle outline and the boundary line is less than the preset distance value, and display the detected image on the display unit 603.

Figure 7:
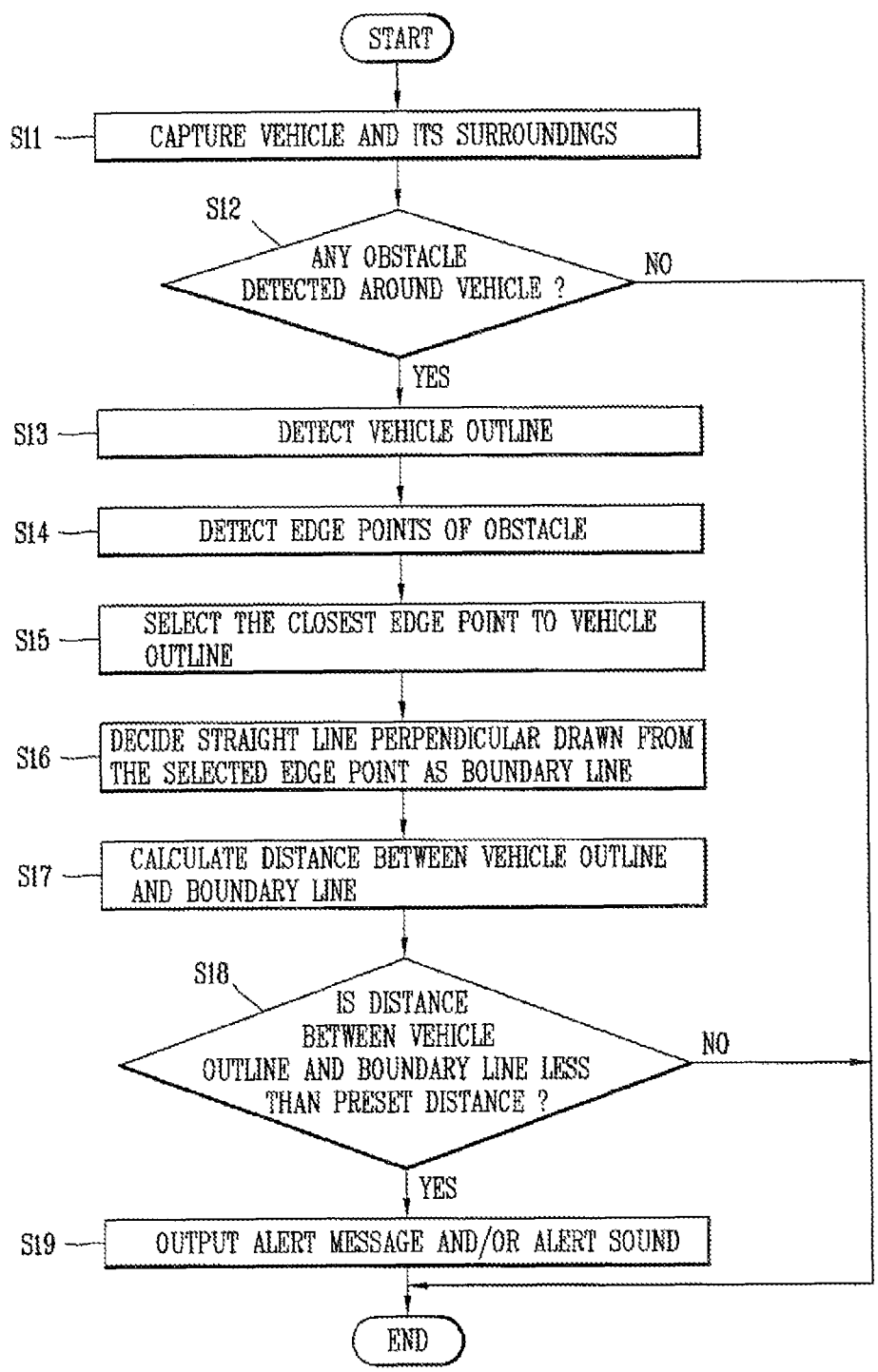
FIG. 7 is a flowchart illustrating a video display method in accordance with a first embodiment.

FIG. 7 is a flowchart illustrating a video display method in accordance with a first embodiment.

First, the capturing unit 604 captures a vehicle and surroundings of the vehicle and outputs the captured images to the controller 601 (S11). The controller 601 may operate the capturing unit 604 when a specific key (for example, a camera activation button) is selected by a user.

The capturing unit 604 may include first to fourth cameras. The first camera may be installed at the center of a front bumper of the vehicle to capture images of the front bumper and around the front bumper. The second camera may be installed at the center of a rear bumper of the vehicle to capture images of the rear bumper and around the rear bumper. The third camera may be installed at the center of a left sidemirror of the vehicle to capture images of the left side and around the left side. The fourth camera may be installed at the center of the right sidemirror of the vehicle to capture images of the right side and around the right side. Here, the installation positions of the first to fourth cameras may be varied according to a designer.

Figure 8:
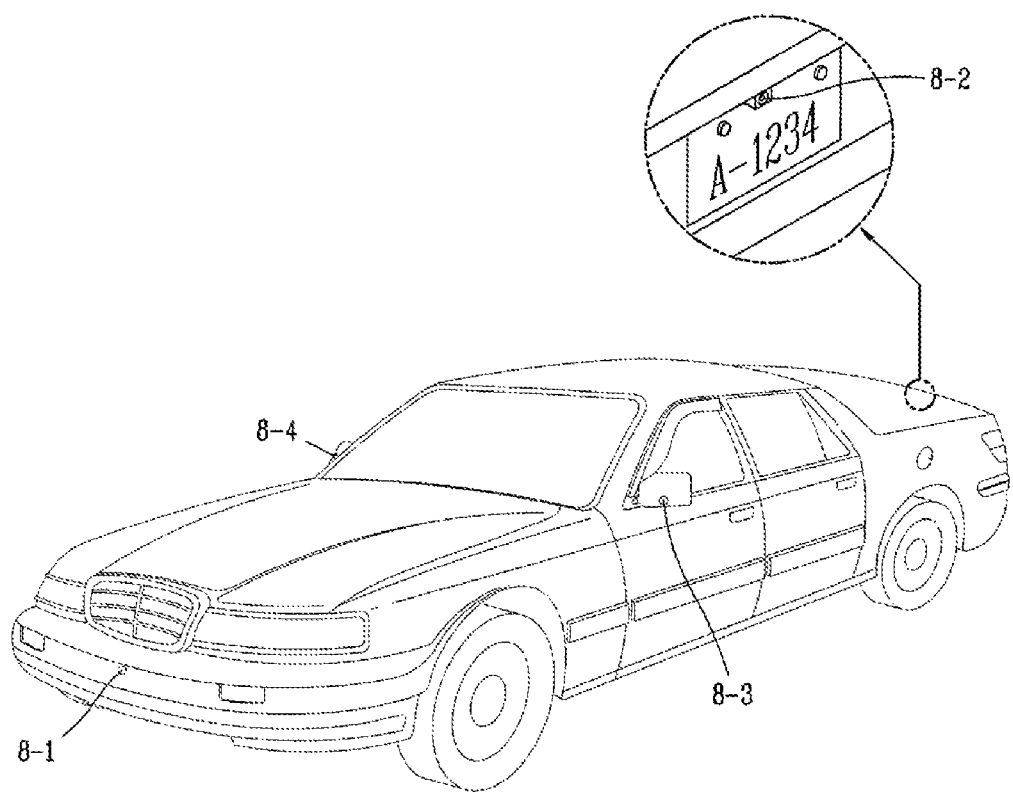
FIG. 8 is an exemplary view illustrating cameras installed in a vehicle in accordance with the first embodiment.

FIG. 8 is an exemplary view illustrating cameras installed in a vehicle in accordance with the first embodiment.

As illustrated in FIG. 8, the first camera 8-1 is fixedly installed at the center of the front bumper of the vehicle so as to capture the front bumper of the vehicle and its surroundings. The second camera 8-2 is fixedly installed at the center of the rear bumper of the vehicle to capture the rear bumper of the vehicle and its surroundings. The third camera 8-3 is fixed installed at the center of a left sidemirror of the vehicle to capture the left side of the vehicle and its surroundings. The fourth camera 8-4 is fixedly installed at the center of the right sidemirror of the vehicle to capture the right side of the vehicle and its surroundings. Here, the installation positions of the first to fourth cameras may be varied according to a designer.

The capturing unit 604 outputs the real-time images corresponding to four directions of the vehicle (for example, a front side image, a rear side image, a left side image and a right side image of the vehicle) to the controller 601.

The controller 601 receives the images (for example, the images in the four directions) input from the capturing unit 604, and determines whether or not any obstacle has been detected around the vehicle based upon the received images (S12). For example, the controller 601 detects an object from the images through the existing object recognition program, and determines the detected object as an obstacle.

The controller 601 detects the vehicle from the images through the existing object recognition program. For example, the controller 601 detects an image of the vehicle by comparing those images with preset vehicle image patterns (e.g., front side image, rear side image and side image of the vehicle) stored in the storage unit 602. Also, the controller 601 detects an outline of the detected vehicle image (S13). Here, the method of detecting the outline of a specific object is a well-known technique, so a detailed description thereof will not be given.

The controller 601 detects edge points of the obstacle (S14), and selects the closest edge point to the outline of the vehicle (S15). The controller 601 then decides a straight line perpendicularly drawn from the selected edge point as a boundary line (S16).

The controller 601 calculates a distance between the vehicle outline and the boundary line. For example, the controller 601 calculates a distance value based upon pixels located between the vehicle outline and the boundary line (i.e., pixels corresponding to one straight line connecting the vehicle outline and the boundary line) (S17). Here, distance values are preset to the pixels. For example, if it is assumed that 30 pixels are present between the vehicle outline and the boundary line and a distance value preset to each pixel is 3 cm, the distance between the vehicle outline and the boundary line is 90 cm (3 cm*30=90 cm).

Figure 9:
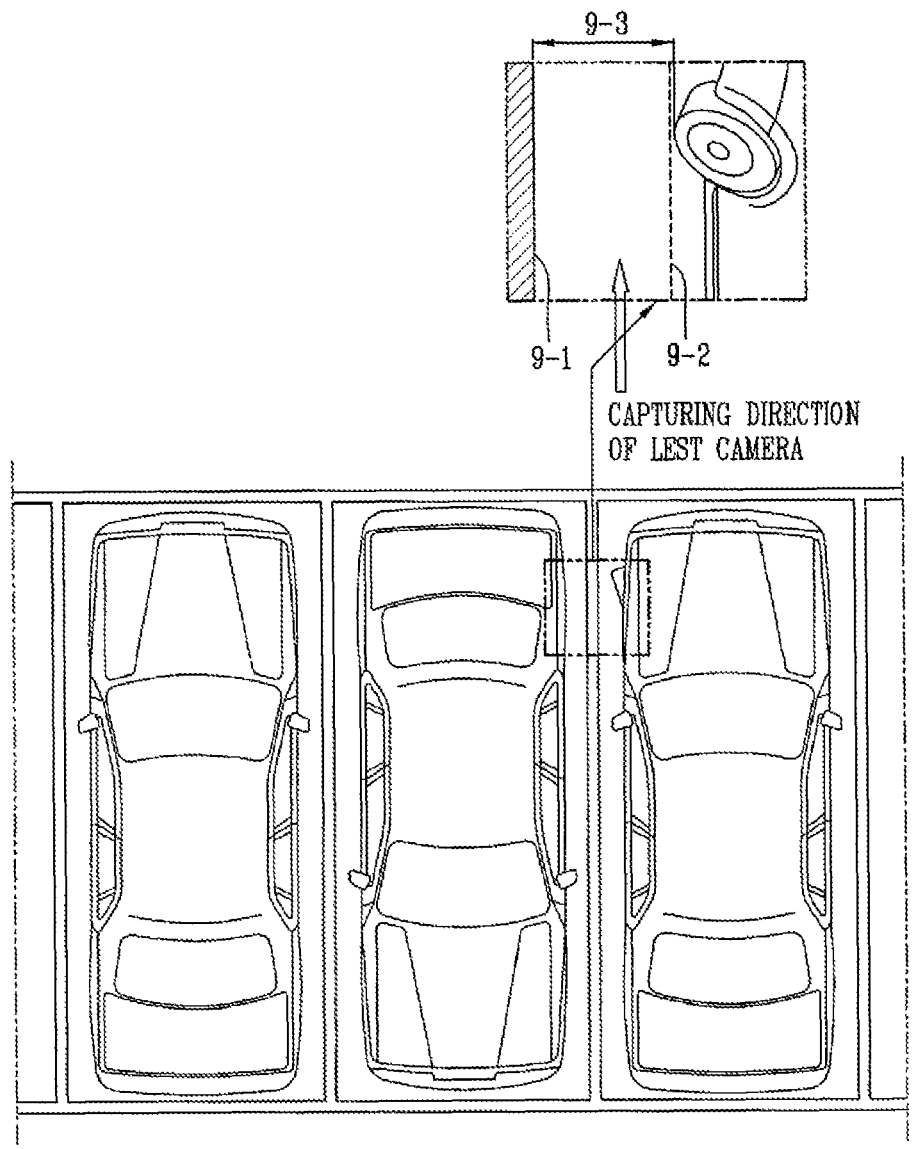
FIG. 9 is an exemplary view illustrating an image captured by a capturing unit in accordance with an exemplary embodiment.

FIG. 9 is an exemplary view illustrating an image captured by the capturing unit in accordance with an exemplary embodiment.

As illustrated in FIG. 9, the controller 601 detects the vehicle outline 9-1 and the boundary line 9-2 from the images output from the third camera 8-3, and calculates a distance value 9-3 between the vehicle outline 9-1 and the boundary line 9-2 in real time.

The controller 601 determines whether the distance value between the vehicle outline and the boundary line is less than a preset distance value (for example, 30 cm) (S18). For example, the controller 601 monitors the distance value between the vehicle outline and the boundary line in real time, thereby determining whether or not the distance value between the vehicle outline and the boundary line is less than the preset distance value (for example, 30 cm).

The controller 601 generates an alert message and/or an alert sound when the distance value between the vehicle outline and the boundary line is less than the preset distance value (for example, 30 cm), and then outputs the generated alert message and/or alert sound (S19). For example, the controller 601 outputs an alert message such as "In danger of crash" on the display unit 603 and outputs an alert sound through a speaker (not shown).

Figure 10:
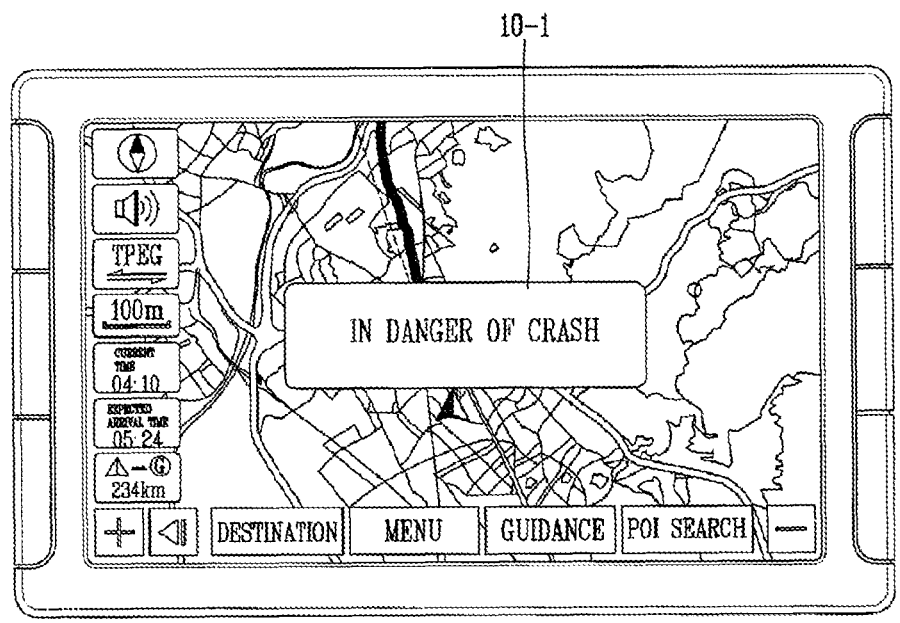
FIG. 10 illustrates an alert message output on a display unit in accordance with an exemplary embodiment.

FIG. 10 illustrates an alert message output on the display unit in accordance with an exemplary embodiment.

As illustrated in FIG. 10, when the distance value between the vehicle outline and the boundary line is less than the preset distance value (for example, 30 cm), the controller 601 generates an alert message 10-1, and outputs the generated alert message 10-1 on the display unit 603.

Consequently, in accordance with the video display apparatus and method according to the first embodiment, the distance between the vehicle outline and the obstacle around the vehicle can be monitored in real time, thereby preventing beforehand damage to a vehicle due to a crash with the obstacle.

Also, in accordance with the video display apparatus and method according to the first embodiment, the real-time monitoring of the distance the vehicle outline and the obstacle around the vehicle can prevent beforehand the damages on a vehicle due to the crash with the obstacle, thereby providing a user with a safe reliable parking system.

In the meantime, the controller 601 may detect an expected traveling path of the vehicle based upon a rotated angle of a steering wheel of the vehicle and a driving direction (forward or reverse movement), and output the expected traveling path on the display unit 603.

Figure 11:
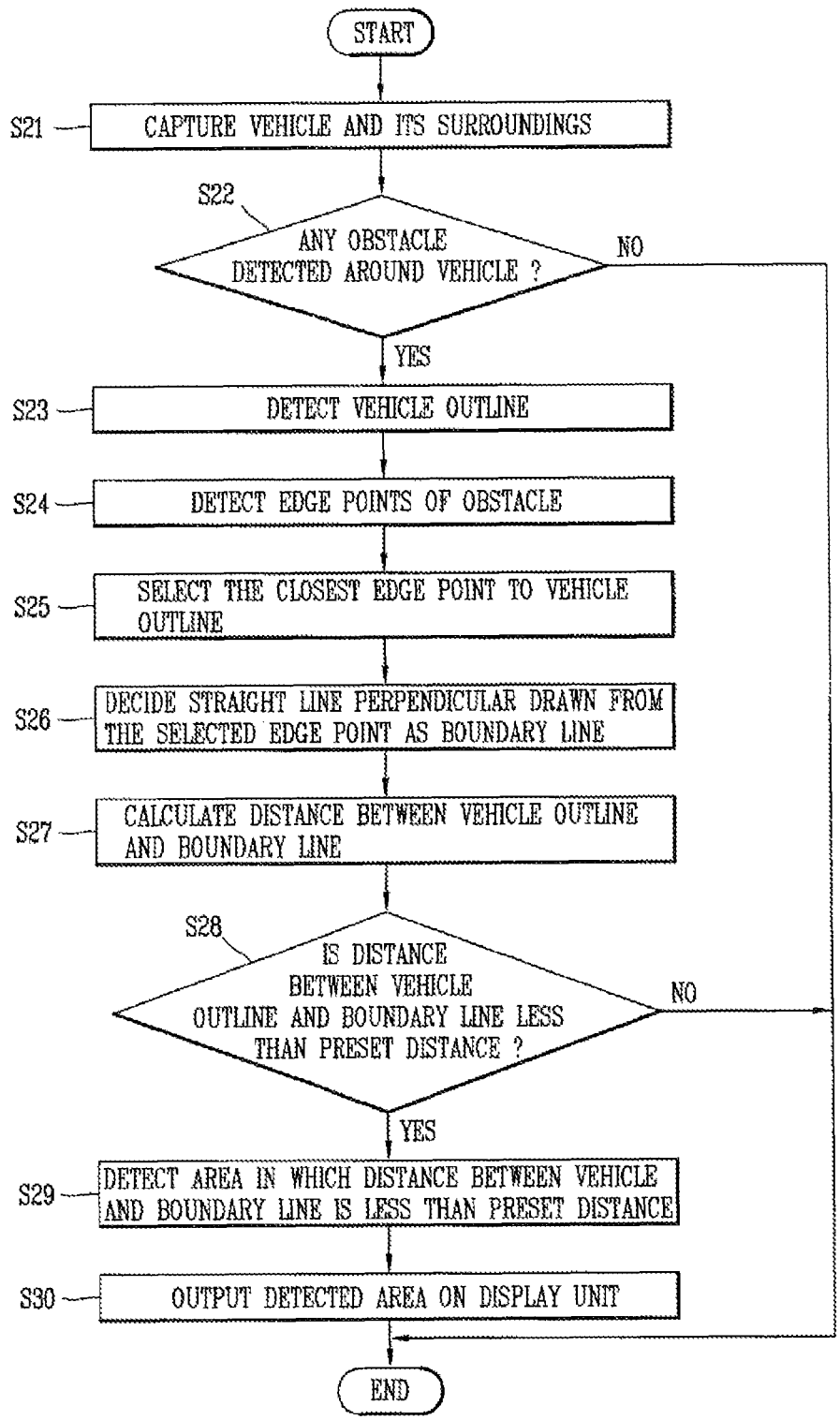
FIG. 11 is a flowchart illustrating a video display method in accordance with a second embodiment.

FIG. 11 is a flowchart illustrating a video display method in accordance with a second embodiment.

First, the capturing unit 604 captures the vehicle and its surroundings, and outputs the captured images to the controller 601 (S21). The capturing unit 604 may include first to fourth cameras. The first camera may be installed at the center of a front bumper of the vehicle to capture images of the front bumper and around the front bumper. The second camera may be installed at the center of a rear bumper of the vehicle to capture images of the rear bumper and around the rear bumper. The third camera may be installed at the center of a left sidemirror of the vehicle to capture images of the left side and around the left side. The fourth camera may be installed at the center of the right sidemirror of the vehicle to capture images of the right side and around the right side. Here, the installation positions of the first to fourth cameras may be varied according to a designer.

The capturing unit 604 outputs the real-time images corresponding to four directions of the vehicle (for example, a front side image, a rear side image, a left side image and a right side image of the vehicle) to the controller 601.

The controller 601 receives the images (for example, the images in the four directions) input from the capturing unit 604, and determines whether or not any obstacle has been detected around the vehicle based upon the received images (S22). For example, the controller 601 detects an object from the images through the existing object recognition program, and decides the detected object as an obstacle.

The controller 601 detects the vehicle from the images through the existing object recognition program. For example, the controller 601 detects an image of the vehicle by comparing those images with preset vehicle image patterns (e.g., front side image, rear side image and side image of the vehicle). Also, the controller 601 detects an outline of the detected vehicle image (S23). Here, the method of detecting the outline of a specific object is a well-known technique, so a detailed description thereof will not be given.

The controller 601 detects edge points of the obstacle (S24), and selects the closest edge point to the outline of the vehicle (S25). The controller 601 then decides a straight line (foot of perpendicular) perpendicularly drawn from the selected edge point as a boundary line (S26).

The controller 601 calculates a distance between the vehicle outline and the boundary line (S27). For example, the controller 601 calculates a distance value based upon pixels located between the vehicle outline and the boundary line (i.e., pixels corresponding to one straight line connecting the vehicle outline and the boundary line). Here, distance values are preset to the pixels. For example, if it is assumed that 30 pixels are present between the vehicle outline and the boundary line and a distance value preset to each pixel is 3 cm, the distance between the vehicle outline and the boundary line is 90 cm (3 cm*30=90 cm).

The controller 601 determines whether the distance value between the vehicle outline and the boundary line is less than a preset distance value (for example, 30 cm) (S28). For example, the controller 601 monitors the distance value between the vehicle outline and the boundary line in real time, thereby determining whether or not the distance value between the vehicle outline and the boundary line is less than the preset distance value (for example, 30 cm).

When the distance value between the vehicle outline and the boundary line is less than the preset distance value (for example, 30 cm), the controller 601 detects an image corresponding to an area, in which the distance value between the vehicle outline and the boundary line is less than the preset distance value (S29). For example, when the distance value between the vehicle outline and the boundary line, which is detected from a first image (for example, an image captured by the fourth camera) of the four directional images input from the capturing unit 604, is less than the preset distance value (for example, 30 cm), the controller 601 outputs the first image to the display unit 603.

Figure 12:
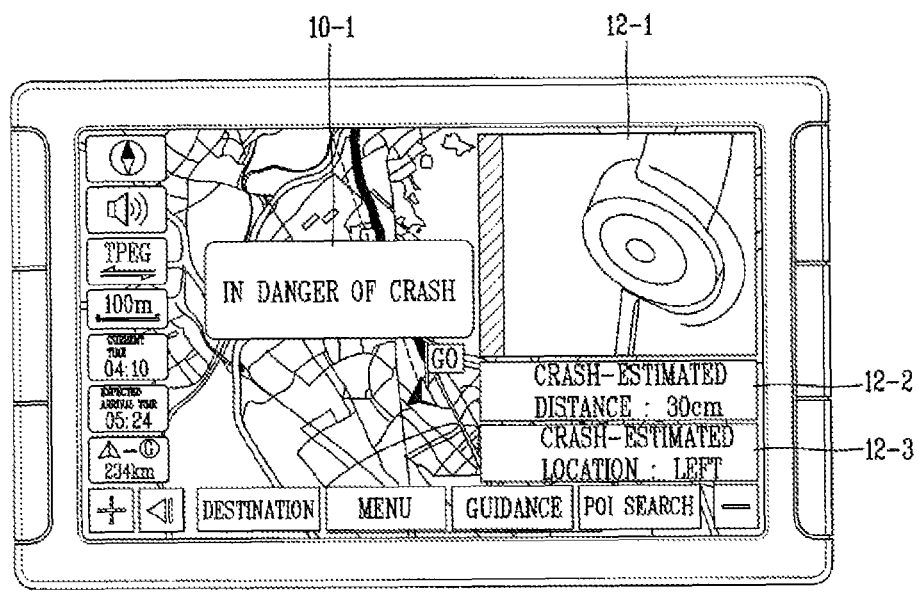
FIG. 12 illustrates an image corresponding to an area in which a distance between a vehicle outline and a boundary line is less than a preset distance value according to the second embodiment.

FIG. 12 illustrates an image corresponding to the area, in which the distance between the vehicle outline and the boundary according to the second embodiment is less than the preset distance value.

As illustrated in FIG. 12, when the distance value between the vehicle outline and the boundary line, which is detected from a first image 12-1 (for example, an image captured by the third camera) of the four directional images input from the capturing unit 604, is less than the preset distance value (for example, 30 cm), the controller 601 outputs the first image 12-1 to the display unit 603. Here, when the distance value between the vehicle outline and the boundary line is less than the preset distance value, the controller 601 outputs the distance value (crash-estimated distance) between the vehicle outline and the boundary line on the display unit 603.

When the image, which corresponds to the area in which the distance between the vehicle outline and the boundary line is less than the preset distance value, is the image input from the left camera (third camera), the controller 601 may display a crash-estimated location (left side) 12-3 on the display unit 603. When the image, which corresponds to the area in which the distance between the vehicle outline and the boundary line is less than the preset distance value, is the image input from the right camera (fourth camera), the controller 601 may display a crash-estimated location (right side) on the display unit 603. When the image, which corresponds to the area in which the distance between the vehicle outline and the boundary line is less than the preset distance value, is the image input from the front camera (first camera), the controller 601 may display a crash-estimated location (front side) on the display unit 603. When the image, which corresponds to the area in which the distance between the vehicle outline and the boundary line is less than the preset distance value, is the image input from the rear camera (second camera), the controller 601 may display a crash-estimated location (rear side) on the display unit 603.

The display unit 603 displays the image 12-1 input from the controller 601 (S30).

Figure 13:
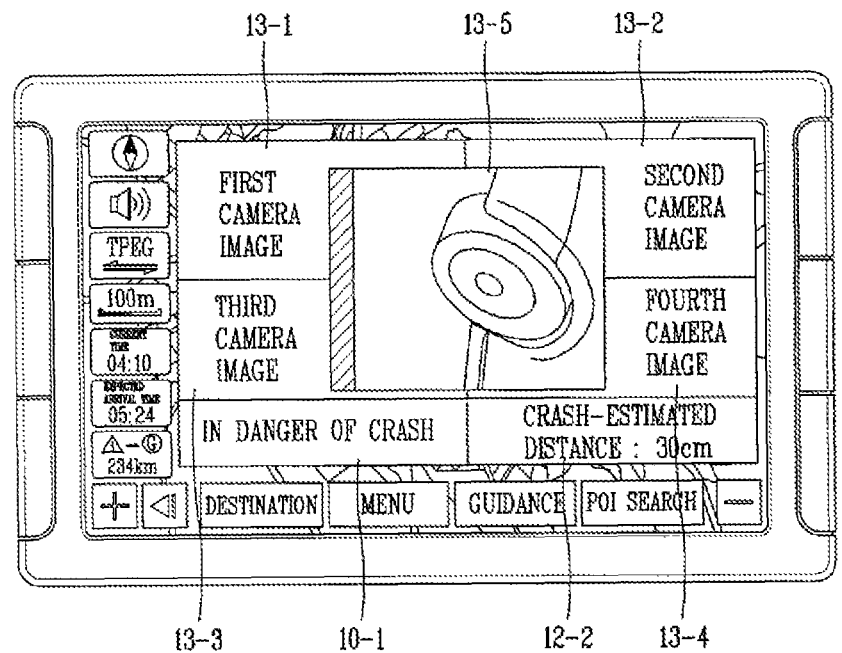
FIG. 13 illustrates an image corresponding to an area in which a distance between a vehicle outline and a boundary line is less than a preset distance value according to the second embodiment.

FIG. 13 illustrates an image corresponding to an area in which the distance between the vehicle outline and the boundary according to the second embodiment is less than the preset distance value.

As illustrated in FIG. 13, the controller 601 outputs on the display unit 603 the four directional images input from the capturing unit 604, namely, a first camera image 13-1, a second camera image 13-2, a third camera image 13-3 and a fourth camera image 13-4. The controller 601 then enlarges an image corresponding to an area in which the distance between the vehicle outline and the boundary line is less than the preset distance value, and displays the enlarged image 13-5 on the display unit 603.

Also, the controller 601 may receive information relating to rotated angle of a steering wheel and gearshifts (for example, forward gear and reverse gear) of the vehicle from a vehicle terminal (not shown) via a vehicle interface, and selectively enlarge an image captured by the capturing unit 604 based upon the information relating to the rotated angle of the steering wheel and the gearshift information of the vehicle. For example, when the rotated angle of the steering wheel is 0° and the gearshift information indicates a forward direction, the controller 601 enlarges an image captured by the front camera 8-1 and displays the enlarged image on the display unit 603. That is, the controller may enlarge only an image captured by a camera, which is located within an area with a greater danger of a crash, thereby allowing a user to intuitively exactly determine the crash-estimated area.

When the rotated angle of the steering wheel is over 10° in a right direction and the gearshift information of the vehicle indicates a forward direction, the controller 601 enlarges images captured by the front camera 8-1 and the right camera 8-4 and displays the enlarged images on the display unit 603. That is, the controller may enlarge only the images captured by the cameras, which are located within areas with a greater danger of a crash, thereby allowing a user to intuitively exactly determine the crash-estimated areas.

When the rotated angle of the steering wheel is over 10° in a left direction and the gearshift information of the vehicle indicates a forward direction, the controller 601 enlarges images captured by the front camera 8-1 and the left camera 8-3 and displays the enlarged images on the display unit 603. That is, the controller 601 may enlarge only the images captured by the cameras, which are located within areas with a greater danger of a crash, thereby allowing a user to intuitively exactly determine the crash-estimated areas.

When the rotated angle of the steering wheel is 0° and the gearshift information of the vehicle indicates a reverse direction, the controller 601 enlarges an image captured by the rear camera 8-2 and displays the enlarged image on the display unit 603. That is, the controller 601 may enlarge only the image captured by the camera s, which is located within an area with a greater danger of a crash, thereby allowing a user to intuitively exactly determine the crash-estimated area.

When the rotated angle of the steering wheel is over 10° in the right direction and the gearshift information of the vehicle indicates a reverse direction, the controller 601 enlarges images captured by the rear camera 8-2 and the left camera 8-3 and displays the enlarged images on the display unit 603. That is, the controller 601 may enlarge only the images captured by the cameras, which are located within areas with a greater danger of a crash, thereby allowing a user to intuitively exactly determine the crash-estimated areas.

When the rotated angle of the steering wheel is over 10° in the left direction and the gearshift information of the vehicle indicates a reverse direction, the controller 601 enlarges images captured by the front camera 8-1 and the right camera 8-4 and displays the enlarged images on the display unit 603. That is, the controller 601 may enlarge only the images captured by the cameras, which are located within areas with a greater danger of a crash, thereby allowing a user to intuitively exactly determine the crash-estimated areas.

Consequently, in accordance with the video display apparatus and method according to the second embodiment, the image, which corresponds to the area in which the distance between the vehicle outline and the boundary line is less than the preset distance value, can be displayed on the display unit 603, thereby preventing beforehand damages on a vehicle due to a crash with an obstacle.

In accordance with the video display apparatus and method according to the second embodiment, it is possible to display on the display unit 603 the image, which corresponds to the area in which the distance between the vehicle outline and the boundary line is less than the preset distance value, the crash-estimated distance, the crash-estimated location, thereby effectively preventing beforehand damages on a vehicle due to a crash with an obstacle.

In accordance with the video display apparatus and method according to the second embodiment, the image, which corresponds to the area in which the distance between the vehicle outline and the boundary line is less than the preset distance value, can be enlarged and displayed on the display unit 603, whereby a user can intuitively check the crash-estimated area of the vehicle.

As described above, in accordance with the video display apparatus and method according to the exemplary embodiments, the distance between the vehicle outline and the obstacle around the vehicle can be monitored in real time, thereby preventing beforehand damages on a vehicle due to a crash with an obstacle.

In accordance with the video display apparatus and method according to the exemplary embodiments, the distance between the vehicle outline and the obstacle around the vehicle can be monitored in real time, thereby preventing beforehand damages on a vehicle due to a crash with an obstacle, resulting in providing a user with a safe reliable parking system.

In accordance with the video display apparatus and method according to the exemplary embodiments, the image, which corresponds to the area in which the distance between the vehicle outline and the boundary line is less than the preset distance value, can be displayed on the display unit, thereby preventing beforehand damages on a vehicle due to a crash with an obstacle.

In accordance with the video display apparatus and method according to the exemplary embodiments, it is possible to display on the display unit the image, which corresponds to the area in which the distance between the vehicle outline and the boundary line is less than the preset distance value, the crash-estimated distance, the crash-estimated location, thereby effectively preventing beforehand damages on a vehicle due to a crash with an obstacle.

In accordance with the video display apparatus and method according to the exemplary embodiments, the image, which corresponds to the area in which the distance between the vehicle outline and the boundary line is less than the preset distance value, can be enlarged and displayed on the display unit, whereby a user can intuitively check the crash-estimated area of the vehicle.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A video display apparatus comprising:
   a capturing unit configured to capture an image of a vehicle and surroundings a first distance from the vehicle;
   a controller configured to detect an outline of the vehicle and a boundary line of an obstacle from the image captured by the capturing unit, calculate the distance between the outline of the vehicle and the boundary line of the obstacle, and generate an alert image when the distance between the vehicle outline and the boundary line is less than a second distance, the second distance being less than the first distance; and
   a display unit configured to display the alert image,
   wherein the controller is further configured to:
      receive, from the capturing unit, a plurality of images including the image of the vehicle and the surroundings, the plurality of images captured in different directions;
      simultaneously display the plurality of images on the display unit;
      select, among the plurality of images, an image corresponding to an area in which the distance between the vehicle outline and the boundary line is less than the second distance;
      enlarge the selected image; and
      display the enlarged image on the display unit, the enlarged image is displayed simultaneously with the displayed plurality of images.

2. The apparatus of claim 1, wherein the controller is further configured to:
   receive information relating to a current rotated angle of a steering wheel of the vehicle and a current gearshift of the vehicle from a vehicle terminal via a vehicle interface;
   select, among the displayed plurality of images, an image corresponding to the current rotated angle and the current gearshift; and
   enlarge the selected image,
   wherein the controller is further configured to:
      select, among the displayed plurality of images, a first image captured in a forward direction of the vehicle when the current rotated angle is 0° and the current gearshift information indicates the forward direction, and enlarge the selected image;
      select, among the displayed plurality of images, a second image captured in a right direction of the vehicle and the first image captured in the forward direction, when the current rotated angle is over 10° in a right direction of the vehicle and the current gearshift information indicates the forward direction, and enlarge the selected first and second images; and
      select, among the displayed plurality of images, a third image captured in a left direction of the vehicle and the first image captured in the forward direction, when the current rotated angle is over 10° in a left direction of the vehicle and the current gearshift information indicates the forward direction, and enlarge the selected first and third images.

3. The apparatus of claim 2, wherein the alert image is the image corresponding to the area in which the distance between the vehicle outline and the boundary line is less than the second distance.

4. The apparatus of claim 2, wherein the alert image comprises an alert message.

5. The apparatus of claim 2, wherein the controller outputs an alert sound when the distance between the vehicle outline and the boundary line is less than the second distance.

6. The apparatus of claim 2, wherein the capturing unit comprises at least one of the following:
   a first camera configured to capture a front side of the vehicle and surroundings of the front side;
   a second camera configured to capture a rear side of the vehicle and surroundings of the rear side;
   a third camera configured to capture a right side of the vehicle and surroundings of the right side; and
   a fourth camera configured to capture a left side of the vehicle and surroundings of the left side.

7. The apparatus of claim 2, wherein the controller detects edge points of the obstacle, selects the closest edge point to the vehicle outline from the edge points, and calculates a straight line perpendicularly drawn from the selected edge point as the boundary line.

8. The apparatus of claim 2, wherein the display unit displays a distance value between the vehicle outline and the boundary line when the distance value between the vehicle outline and the boundary line is less than the second distance.

9. The apparatus of claim 2, wherein the display unit displays a crash-estimated location based upon the image corresponding to the area in which the distance between the vehicle outline and the boundary line is less than the second distance.

10. The apparatus of claim 2, wherein the display unit is a mobile communication terminal, a telematics terminal or a navigational system.

11. The apparatus of claim 2, wherein the controller is further configured to:
   select, among the displayed plurality of images, a fourth image captured in a reverse direction of the vehicle when the current rotated angle is 0° and the current gearshift information indicates the reverse direction, and enlarge the selected image;
   select, among the displayed plurality of images, the second image captured in a right direction of the vehicle and the fourth image captured in the reverse direction, when the current rotated angle is over 10° in the right direction of the vehicle and the current gearshift information indicates the reverse direction, and enlarge the selected second and fourth images; and
   select among the displayed plurality of images, the third image captured in the left direction of the vehicle and the fourth image captured in the reverse direction, when the current rotated angle is over 10° in the left direction of the vehicle and the current gearshift information indicates the reverse direction, and enlarge the selected third and fourth images.

12. A video display method comprising:
   capturing an image of a vehicle and surroundings a first distance from the vehicle by a capturing unit;
   detecting an outline of the vehicle and a boundary line of an obstacle from the image captured by the capturing unit;
   calculating a distance between the outline of the vehicle and the boundary line of the obstacle;
   generating an alert image when the distance between the vehicle outline and the boundary line is less than a second distance, the second distance being less than the first distance;
   displaying the alert image on a display unit;
   receiving, from the capturing unit, a plurality of images including the image of the vehicle and the surroundings, the plurality of images captured in different directions;
   simultaneously displaying the plurality of images on the display unit;
   selecting, among the plurality of images, an image corresponding to an area in which the distance between the vehicle outline and the boundary line is less than the second distance;
   enlarging the selected image; and
   displaying the enlarged image on the display unit, the enlarged image is displayed simultaneously with the displayed plurality of images.

13. The method of claim 12, further comprising:
   receiving information relating to a current rotated angle of a steering wheel of the vehicle and a current gearshift of the vehicle from a vehicle terminal via a vehicle interface;
   selecting, among the displayed plurality of images, an image corresponding to the current rotated angle and the current gearshift, and enlarging the selected image;
   wherein selecting the image corresponding to the current rotated angle and the current gearshift comprises:
      selecting, among the displayed plurality of images, a first image captured in a forward direction of the vehicle when the current rotated angle is 0° and the current gearshift information indicates the forward direction, and enlarging the selected image;
      selecting, among the displayed plurality of images, a second image captured in a right direction of the vehicle and the first image captured in the forward direction, when the current rotated angle is over 10° in a right direction of the vehicle and the current gearshift information indicates the forward direction, and enlarging the selected first and second images; and
      selecting, among the displayed plurality of images, a third image captured in a left direction of the vehicle and the first image captured in the forward direction, when the current rotated angle is over 10° in a left direction of the vehicle and the current gearshift information indicates the forward direction, and enlarging the selected first and third images.

14. The method of claim 13, wherein the alert image is the image corresponding to the area in which the distance between the vehicle outline and the boundary line is less than the second distance.

15. The method of claim 13, further comprising:
   outputting an alert sound when the distance between the vehicle outline and the boundary line is less than the second distance.

16. The method of claim 13, wherein detecting of the boundary line of the obstacle comprises:
   detecting edge points of the obstacle;
   selecting the closest edge point to the outline of the vehicle from the edge points; and
   calculating a straight line perpendicularly drawn from the selected edge point as the boundary line.

17. The method of claim 13, further comprising displaying a distance value between the vehicle outline and the boundary line on the display unit when the distance value between the vehicle outline and the boundary line is less than the second distance.

18. The method of claim 13, further comprising displaying a crash-estimated location on the display unit corresponding to an area in which the distance between the vehicle outline and the boundary line is less than the second distance.

19. The method of claim 13, wherein selecting the image corresponding to the current rotated angle and the current gearshift comprises:
   selecting, among the displayed plurality of images, a fourth image captured in a reverse direction of the vehicle when the current rotated angle is 0° and the current gearshift information indicates the reverse direction, and enlarging the selected image;
   selecting, among the displayed plurality of images, the second image captured in a right direction of the vehicle and the fourth image captured in the reverse direction, when the current rotated angle is over 10° in the right direction of the vehicle and the current gearshift information indicates the reverse direction, and enlarging the selected second and fourth images; and
   selecting, among the displayed plurality of images, the third image captured in the left direction of the vehicle and the fourth image captured in the reverse direction, when the current rotated angle is over 10° in the left direction of the vehicle and the current gearshift information indicates the reverse direction, and enlarging the selected third and fourth images.

* * * * *